March 14, 1967 S. McCLENDON ET AL 3,309,533
SWEEP-TRIGGER-CIRCUIT EMPLOYING TUNNEL-DIODE DIFFERENTIAL-AMPLIFIER AND TIMING-NETWORK PROVIDING EITHER AUTOMATIC OR SYNCHRONIZED-INPUT TRIGGERING OF SWEEP
Filed May 5, 1964
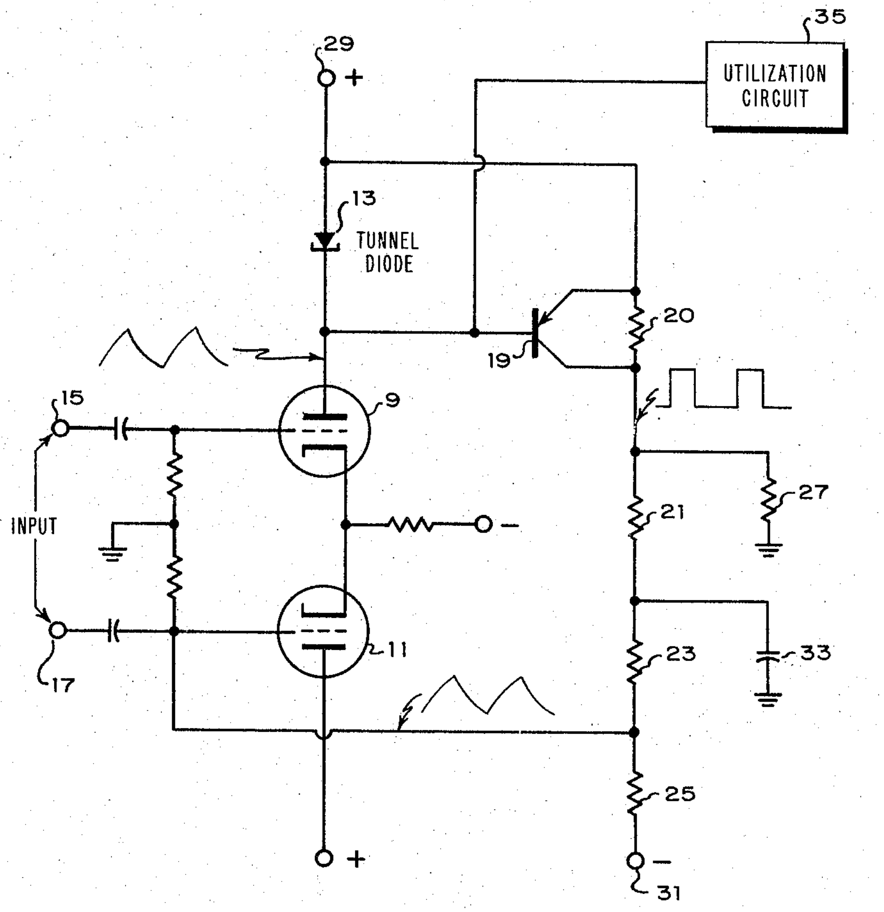
INVENTORS
SCOTT McCLENDON
NORMAN B. SCHROCK
BY A. C. Smith
ATTORNEY

United States Patent Office 3,309,533

Patented Mar. 14, 1967

3,309,533

SWEEP-TRIGGER-CIRCUIT EMPLOYING TUNNEL-DIODE DIFFERENTIAL-AMPLIFIER AND TIMING-NETWORK PROVIDING EITHER AUTOMATIC OR SYNCHRONIZED-INPUT TRIGGERING OF SWEEP

Scott McClendon, Palo Alto, and Norman B. Schrock, Los Altos Hills, Calif., assignors to Hewlett-Packard Company, Palo Alto, Calif., a corporation of California Filed May 5, 1964, Ser. No. 365,048
4 Claims. (Cl. 307—88.5)

This invention relates to a sweep-triggering circuit for an oscilloscope.

Oscilloscope sweep circuits are commonly synchronized to applied signals by triggering the sweep at the same selected point on the waveform for each recurrence of a signal under examination. In the absence of applied signal however, the sweep must be triggered in a free-running mode in order to provide a base line on the display screen. However, the sweep must then be adjusted to operate in the triggered mode when signal is applied in order to synchronize the sweep with the applied signal.

Accordingly, it is an object of the present invention to provide a sweep trigger circuit which automatically trigers the sweep in the absence of applied signal and which triggers the sweep in synchronism with applied signal.

It is another object of the present invention to provide a circuit which produces recurring sweep trigger signals in the absence of applied signal and which produces sweep trigger signal at the same selected point on the waveform of an applied signal.

In accordance with the illustrated embodiment of the present invention an input signal is applied to one or both inputs of a pair of differentially-connected gain elements to drive a tunnel diode connected in the output of one of the gain elements at the frequency of the applied signal. Trigger pulses derived from the signal across the tunnel diode are applied to the sweep circuit of an oscilloscope. The signal across the tunnel diode is also fed back to the input of the other of the pair of gain elements in proper phase relationship to produce sustained low-frequency oscillations in the absence of signal applied to the gain elements. Thus, trigger pulses are applied to the sweep circuit in the absence of applied signal and are also applied to the sweep circuit in synchronism with an applied signal.

Other and incidental objects of the present invention will be apparent from a reading of this specification and an inspection of the accompanying drawing which shows a schematic diagram of the trigger circuit of the present invention.

Referring to the drawing, there is shown a pair of tubes 9 and 11 having the cathodes commonly connected to form a differential amplifier. A tunnel diode 13 is connected to conduct the plate current of tube 9. This diode changes operating states each time the plate current of tube 9 varies beyond the peak and valley current values of the diode. Differential signal applied to the inputs 15 and 17 of tubes 9 and 11 varies the current through the tunnel diode 13 sufficiently to cause it to change operating states and produce a square wave signal across its terminals having the same frequency as the signal applied to inputs 15 and 17 (with one exception, described below). This square wave is applied to a utilization circuit 35 such as a sweep generator to initiate a sweep voltage for application to the horizontal deflection plates of a cathode ray oscilloscope tube in synchronism with an input signal.

In the absence of input signal at terminals 15 and 17, the circuit operates as a relaxation oscillator to produce a low-frequency signal which triggers the utilization circuit repetitively. Transistor 19 receives the signal appearing across tunnel diode 13 and forms alternately an open and shunt circuit around resistor 20 of the voltage divider including resistors 21, 23, 25 and 27 connected between supply terminals 29 and 31. This provides a signal of selected peak amplitude, say 10 volts, for application to timing capacitor 33. This capacitor charges exponentially toward the voltage present at the common connection of resistors 21 and 23 with a time constant which is determined by the value of capacitor 33 and by the equivalent resistance of the circuit "seen" from the terminals of capacitor 33. The voltage on the common connection of resistors 21 and 23 toward which capacitor 33 charges and the equivalent resistance of the circuit "seen" by capacitor 33 are thus determined by the conductance state of transistor 19 which shunts resistor 20. The portion of the exponentially changing capacitor voltage present at the common connection of the resistors 23 and 25 which are connected to form a signal divider is applied to the grid of tube 11. This causes the signal on the commonly connected cathodes to vary in phase with the exponentially varying signal applied to the grid of tube 11. The current through tunnel diode 13 thus varies beyond its peak or valley current value in response to this grid signal, thereby causing the tunnel diode 13 to switch conduction states. The sudden change in voltage across tunnel diode 13 due to its change in conduction state causes transistor 19 to change conduction state which, in turn, causes the voltage across capacitor 33 to change exponentially in the opposite direction. This, in turn, causes the current through diode 13 to vary in the opposite direction toward its peak or valley current value. As a result, a low frequency square wave (say, about 40 cycles per second) is produced to initiate the sweep voltage recurringly in the absence of input signal.

When a low-level signal of lower frequency than the relaxation frequency of the circuit is applied to the inputs of tubes 9 and 11, the current through the tunnel diode 13 due to the input signal and to the relaxation oscillation combine to trigger the tunnel diode at varying times along the input waveform, thus making synchronization of the sweep voltage with the input signal difficult to achieve. This difficulty may be overcome, however, by increasing the amplitude of the input signal before applying it to tubes 9 and 11 to insure that the input signal is predominantly effective in triggering the tunnel diode 13.

We claim:

1. An oscilloscope circuit comprising:
a tunnel diode and means connected thereto for biasing the tunnel diode for two-state operation on its peak and valley current characteristic;
a controllable current source responsive to an input signal and connected to said tunnel diode for applying current thereto with sufficient amplitude to vary the current therethrough continuously beween the peak and valley current value of the tunnel diode to switch the operating states thereof at such values in response to the continuous variations with time of the amplitude of an input signal applied to the current source;
a timing circuit having an input and an output and including resistance and reactance;
means connecting the input of the timing circuit to receive the signal appearing across the tunnel diode and means connecting the output of the timing circuit to the current source to form a relaxation oscillator circuit in the absence of input signal applied to the current source for producing output signals in response to variations of the current though the tunnel diode between the peak and valley current values thereof at a rate determined by the time constant of the resistance and reactance of the timing circuit.

2. An oscilloscope circuit comprising:

a tunnel diode and means connected thereto for biasing the tunnel diode for two-state operation on its peak and valley current characteristic;

an amplifier having an input for receiving an input signal and having an output connected to said tunnel diode for applying current thereto with sufficient amplitude to vary the current therethrough between the peak and valley current values of the tunnel diode to switch the operating states thereof at such values at a rate related to the frequency of the input signal;

a timing circuit including resistance and reactance connected to receive the signal appearing across the tunnel diode; and circuit means connecting the timing circuit and the input of said amplifier to form a relaxation oscillator circuit in the absence of input signal for producing signals at said output in response to variation of the current through the tunnel diode between the peak and valley current values thereof at a rate related to the time constant of the resistance and reactance of the timing circuit.

3. An oscilloscope circuit as in claim 2 wherein:

said amplifier includes a pair of differentially connected gain elements, each having an input;

said circuit means connects the timing circuit and one of the inputs of the gain elements; and said input signal is applied to at least one of the inputs of said gain elements.

4. An oscilloscope circuit comprising:

a tunnel diode and means connected thereto for biasing the tunnel diode for two-state operation on its peak and valley current characteristic;

an amplifier having an output and having a positive-gain input and a negative-gain input;

means connected to one of said inputs of the amplifier for applying an input signal thereto with sufficient amplitude to vary the current through the tunnel diode between said peak and valley current value to switch the operating states of the tunnel diode at such values at a rate related to the frequency of an applied input signal;

a signal divider including a plurality of resistors serially connected to a source of bias signal;

a capacitor connected to the common connection of a pair of resistors in said signal divider to form a timing circuit;

means including a signal-controlled conductance element connected to said signal divider and to said tunnel diode for altering the voltage at said common connection in response to the conduction state of said element;

means connecting said common connection to one of said positive- and negative-gain inputs of said amplifier to form a relaxation oscillator circuit in the absence of input signal applied to an input of said amplifier for producing output signals in response to variations of the current though the tunnel diode between the peak and valley current values thereof at a rate related to the time constant of the resistance and capacitance of said timing circuit.

References Cited by the Examiner

UNITED STATES PATENTS

| | | | |
|---|---|---|---|
| 3,138,764 | 6/1964 | Dalton et al. | 307—88.5 |
| 3,176,152 | 3/1965 | Spiegel | 307—88.5 |
| 3,187,263 | 6/19665 | Rosenstein | 331—153 X |
| 3,215,854 | 11/1965 | Mayhew | 307—88.5 |

DAVID J. GALVIN, *Primary Examiner.*

ARTHUR GAUSS, *Examiner.*

J. S. HEYMAN, *Assistant Examiner.*